United States Patent [19]

Sugimoto et al.

[11] Patent Number: 5,131,000
[45] Date of Patent: Jul. 14, 1992

[54] CHRYSOBERYL SOLID STATE LASERS

[75] Inventors: Akiko Sugimoto, Ageo; Yusaburo Segawa, Wako; Pil H. Kim, Wako; Susumu Nanba, Wako, all of Japan

[73] Assignees: Mitsui Mining & Smelting Co., Ltd., Tokyo; Rikagaku Kenkyusho, Wako, both of Japan

[21] Appl. No.: 559,644

[22] Filed: Jul. 30, 1990

[30] Foreign Application Priority Data

Aug. 2, 1990 [JP] Japan .................................. 1-199483

[51] Int. Cl.$^5$ .............................................. H01S 3/16
[52] U.S. Cl. ......................................... 372/41; 372/69; 372/70; 252/301.4 F; 501/86
[58] Field of Search ................................. 372/39-41, 372/69-72, 66; 252/301.4 R, 301.4 F; 501/86; 156/600, 605

[56] References Cited

U.S. PATENT DOCUMENTS

| | | | |
|---|---|---|---|
| 3,997,853 | 12/1976 | Morris et al. ........................ | 372/41 |
| 4,218,282 | 8/1980 | Kochi ................................ | 372/41 X |
| 4,272,733 | 6/1981 | Walling et al. ...................... | 372/20 |
| 4,634,492 | 1/1987 | Oguri et al. ........................ | 156/605 |
| 4,765,925 | 8/1988 | Anzai et al. ................... | 252/301.4 F |
| 4,791,927 | 12/1988 | Merger .............................. | 128/303.1 |
| 4,932,031 | 6/1990 | Alfano et al. ....................... | 372/41 |

OTHER PUBLICATIONS

Tunable Alexandrite Lasers; J. C. Walling, et al; IEEE Journal of Quantum Electronics; vol. QE-16, No. 12, Dec. 1980; pp. 1302-1315.

Spectroscopic Properties of $Ti^{3+}$ –doped $BeAl_2O_4$; Sugimoto, et al; J. Opt. Soc. Am. B/vol. 6, No. 12/Dec. 1989; pp. 2334-2337.

Spectroscopy of $Cr^{3+}$ and $Cr^{4+}$ ions in Forsterite; Weiyi Jia, et al; American Physical Society, Mar. 1991; pp. 43 5234-5242.

Fluorescence Analysis of Chromium-Doped Forsterite ($Mg_2SiO_4$); Moncorge, et al; IEEE Journal of Quantum Electronics, vol. 27, No. 1, Jan. 1991; pp. 114-120.

*Primary Examiner*—Georgia Y. Epps
*Attorney, Agent, or Firm*—Bucknam and Archer

[57] ABSTRACT

A chrysoberyl solid state laser comprising:

(a) a rod-like laser medium composed of a chrysoberyl single crystal containing trivalent titanium ions as luminescent ions, the direction of c-axis of said crystal being made approximately the same as the longitudinal direction of the rod.

(b) a means for generating excitation light for exciting said luminescent ions to emit light therefrom.

(c) a means for focussing excitation light, generated by said means for generating excitation light, in said laser medium, and (d) a light resonator for generating oscillated laser light by resonating the light emitted from said luminescent ions with said focussed excitation light.

2 Claims, 3 Drawing Sheets

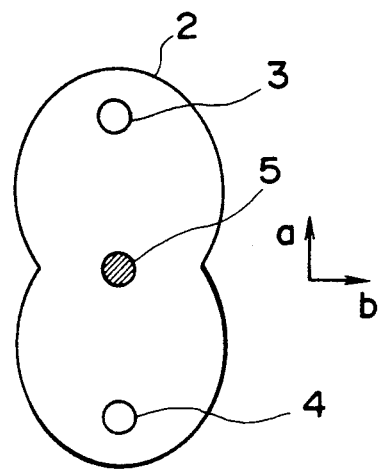
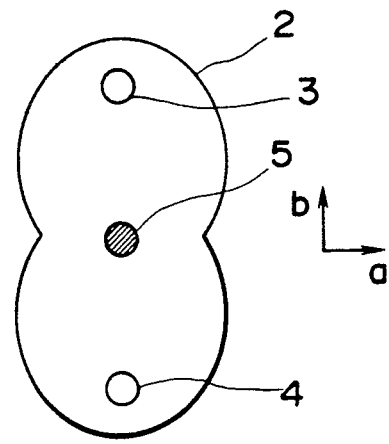
F I G. 2(a)    F I G. 2(b)
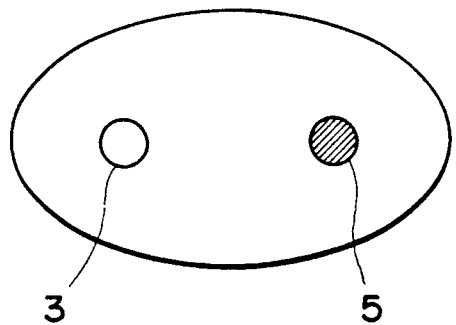
F I G. 4

CHRYSOBERYL SOLID STATE LASERS

BACKGROUND OF THE INVENTION

1. Field of the Invention

This invention relates to chrysoberyl solid state lasers and more particularly it relates to such lasers which are provided with a laser medium consisting of chrysoberyl ($BeAl_2O_4$) single crystal containing trivalent titanium ions as luminescent ions, an excitation light emission means, an excitation light focussing means and a light resonator and in which the directions of crystal axes of the chrysoberyl single crystal constituting said laser medium are specified.

2. Description of the Prior Art

Solid state lasers are being increasingly used in various industrial fields because of their small size, high output power, easy maintenance and excellent stability.

Among the solid state lasers, those having trivalent titanium ions as luminescent ions are expected to be used in various fields since they can be tuned so that they oscillate to produce a wavelength over a continuous and extremely wide range. Among others, chrysoberyl single crystals doped with trivalent titanium ions have been proposed for use as very promising solid state lasers media as described in U.S. Pat. No. 4,765,925 which corresponds to Japanese Pat. Appln. Laid-Open Gazette No. Sho.62-216286 assigned to the same assignee as the present application. This single crystal has a wide absorption band, the center of wavelengths of which is 500 nm, it emits light in a wide region of from 600 nm to over 950 nm, and wavelength-variable solid state lasers having wavelength tunability in the above wide region are expected to be realized.

Further, the present inventors have also proposed a solid state laser in which excitation light emitted from a source of excitation light is focussed on the laser medium with a focussing lens and then luminescent ions are excited in the laser medium thereby to emit oscillated laser light. This solid state lasers, however, is not satisfactory in size, output etc.

This invention was made in view of the above circumstances.

The primary object of this invention is to provide chrysoberyl solid state lasers which are further improved in energy efficiency over the above conventional lasers.

SUMMARY OF THE INVENTION

The above object of this invention is achieved by the provision of chrysoberyl solid state lasers which are provided with a laser medium consisting of chrysoberyl single crystals containing trivalent titanium ions as luminescent ions, a means for generating excitation light, and a means for focussing excitation light and a light resonator and in which the directions of crystal axes of the chrysoberyl single crystal constituting the laser medium are specified.

More specifically, the crux of this invention resides in a chrysoberyl solid state lasers which is provided with:

(a) a rod-like laser medium composed of a chrysoberyl single crystal containing trivalent titanium ions as luminescent ions, the direction of c-axis of said crystal being made approximately the same as the longitudinal direction of the rod, (b) a means for generating excitation light for exciting said luminescent ions to emit light therefrom, (c) a means for focussing excitation light, generated by said means for generating excitation light, in said laser medium, and (d) a light resonator for generating oscillated laser light by resonating the light emitted from said luminescent ions with said focussed excitation light, and in which the laser medium is disposed so that the direction of b-axis of the chrysoberyl single crystal constituting the laser medium is approximately perpendicular to the plane including both the longitudinal direction of the laser medium and that of the means for generating excitation light.

The trivalent titanium ion-containing chrysoberyl single crystal which is used as a laser medium in this invention belongs to the orthorhombic system and is represented by space group $D_{2h}^{16}$-Pmnb, and the lattice constant thereof is a=0.5476 nm, b=0.9404 nm and c=0.4425 nm. Further, in such a chrysoberyl single crystal, the a-axis, b-axis and c-axis are perpendicular to one another in their respective axial directions.

The chrysoberyl single crystal used in this invention is prepared by being grown by a Czochralski technique or a floating zone melting technique, and the former is suitably used in order to prepare a chrysoberyl single crystal of large size and high quality. In one example of the Czochralski technique, starting materials to be described later are introduced into an iridium-made crucible which is then placed in a high-frequency induction heating type Czochralski furnace or the like to completely melt the starting materials, after which seed crystals are contacted with the surface of the melted materials while rotating the seed crystal and the seed crystal so contacted is slowly pulled up from the crucible to grow chrysoberyl single crystal, this technique being a generally-used one. In this case, there can satisfactorily be obtained a trivalent titanium ion-containing chrysoberyl single crystal which is free of inclusions and segregated matters by selecting the conditions for growth.

The atmosphere in which the growth is carried out may generally be a hydrogen gas, nitrogen gas or argon gas atmosphere, or an atmosphere of a mixture of these gases, and it is preferable that the partial pressure of oxygen in the system for growth be in the range of from $10^{-9}$ to $10^{-17}$ atm.

The starting materials previously described are beryllium oxide (BeO), aluminum oxide ($Al_2O_3$) and, in addition, titanium (III) oxide ($Ti_2O_3$) as a luminescent ion. It is preferred that trivalent titanium ions be contained in an amount by weight of 0.01-1.0% in the single crystal. If the content of trivalent titanium ions is less than 0.01 wt. % then the luminescence will be weakened, and, on the other hand, if the content thereof is more than 1.0 wt. % then the residual absorption coefficient, in an oscillation wavelength region, of the resulting matrix composed of chrysoberyl single crystal will undesirably increase.

The thus obtained chrysoberyl single crystal is worked to obtain a rod which is cut at both the ends and further optically polished at both the ends to obtain a laser medium. When the chrysoberyl single crystal is to be worked to obtain the rod, it is worked so that its c-axis direction becomes the longitudinal direction of the resulting rod-like laser medium. There are no particular restriction in the cutting of both the ends of the rod and, however, the cutting may be effected perpendicularly to the longitudinal direction of the rod or may be effected to make a Brewster's angle with respect to the axial direction thereof. In addition, both the ends so polished may be subjected to AR (antireflection) coating as required.

It is necessary that the solid state laser of this invention have a means for generating excitation light to excite the luminescent ions in the chrysoberyl single crystal. The excitation light generating means is required to have light emission spectra corresponding to the absorption bands of the $Ti^{3+}$ and may be a straight-tube type flashlamp, arc lamp or like lamp in which xenon (Xe), krypton (Kr) or like gas is used.

It is further necessary that the solid state laser of this invention have a means for focussing excitation light in the chrysoberyl single crystal. The excitation light focussing means may be such a one as to enable the excitation light emitted from the excitation light generating means to be focussed in the laser medium, and it is exemplified by a single elliptic cylinder-shaped or double elliptic cylinder-shaped reflection focussing mirror. The reflection mirror surface is required to have satisfactory reflection properties in a wavelength region corresponding to the absorption bands of $Ti^{3+}$ and may be such a one that is plated with gold, silver, aluminum or the like.

It is still further necessary that the solid state laser of this invention have a light resonator for generating oscillated laser light by resonating light emitted from the luminescent ions, and the light resonator may be of any optional construction and may have the same construction as a normally-used conventional light resonator.

The chrysoberyl solid state laser of this invention is provided with the above-mentioned laser medium, means for generating excitation light, means for focussing excitation light and light resonator, and it is more preferable that said chrysoberyl solid state laser be such that the direction of b-axis of the chrysoberyl single crystal constituting the laser medium is approximately perpendicular to the plane including both the longitudinal direction of the laser medium and that of the excitation light-generating means.

The present chrysoberyl solid state laser is not particularly restricted in the other constructional parts thereof, and it may have the same other constructional parts, such as a prism, Q switch or other oscillation control elements placed in the light path of the light resonator, as the conventional ordinary solid state lasers.

Figure 3:
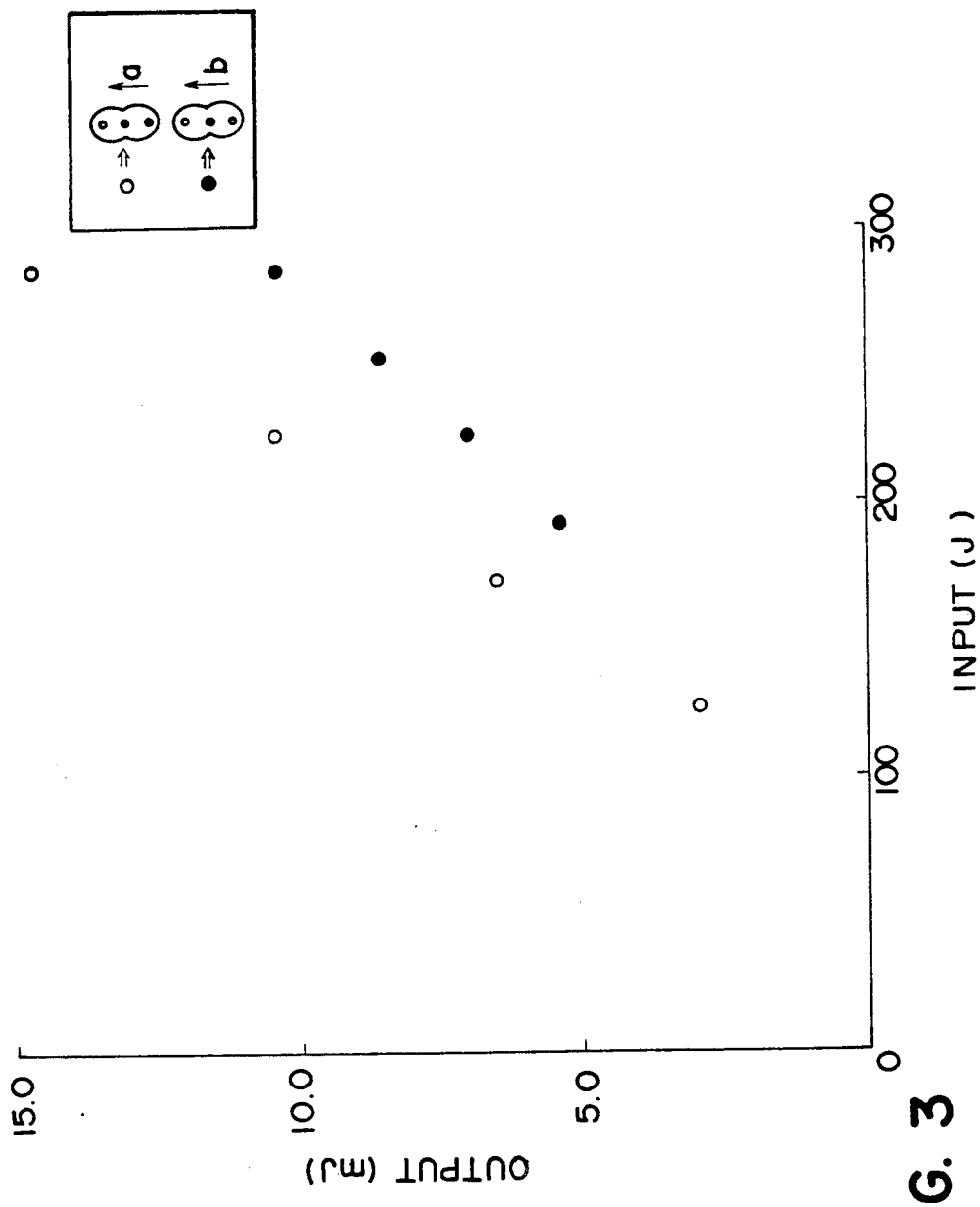

FIGS. (2a and 2b) show the relationship between the excitation light source and the axial direction of the chrysoberyl single crystal in the experimental apparatus used in said Example of the present invention;

FIG. 3 shows input and output characteristics appreciated at the time of changing the axial direction of chrysoberyl single crystal with respect to the excitation light source; and FIG. 4 is a cross-sectional view of a single elliptic cylinder-shaped reflection focussing mirror which is usable in a variation of the present invention.

DESCRIPTION OF THE PREFERRED EMBODIMENTS

This invention will be better understood by the following Examples.

EXAMPLE 1

The starting materials, which consisted of a 99.99% pure beryllium oxide, a 99.999% pure aluminum oxide and a 99.9% pure titanium (III) oxide in respective amounts of 19.5 wt. %, 79.4 wt. % and 1.1 wt. %, were introduced into an iridium-made crucible and melted in a high-frequency induction heating type Czocharlski furnace where a gas mixture prepared from nitrogen, hydrogen and a very small amount of water vapor ($H_2O$) so as to obtain a partial oxygen pressure of $10^{-11}$ atm. in the crystal—growing atmosphere had been introduced. After the starting materials were completely melted, a seed crystal was contacted with the surface of the melt while slowly rotating them and then pulled up at a velocity of 0.5 mm/hr from the crucible thereby to obtain chrysoberyl single crystals containing trivalent titanium ions. Further, since the melting point of the resulting chrysoberyl single crystal was approximately 1870° C., the growth of the chrysoberyl single crystal was carried out in the neighborhood of this temperature.

Figure 1:
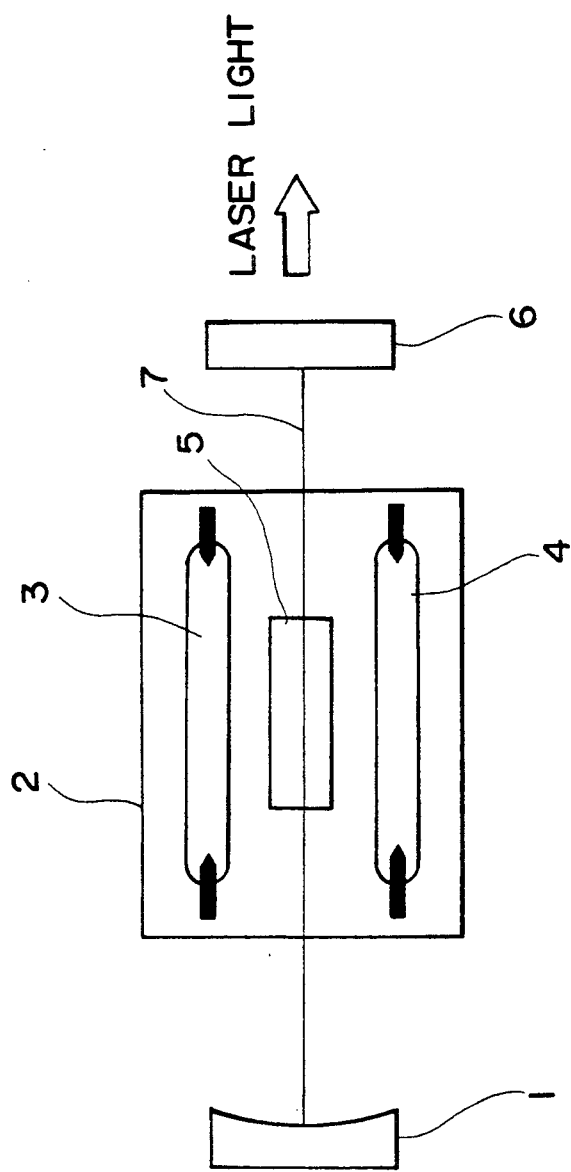
FIG. 1 shows the construction of an experimental apparatus used in one Example of the present invention.

The thus obtained chrysoberyl single crystal was cut to obtain a rod having a dimension of 5 mm$\phi \times$ 57 mmI. In this case, the rod was prepared so that the direction of c-axis of the chrysoberyl single crystal agrees with the longitudinal direction of the rod, and was then cut at both the ends perpendicularly to the longitudinal direction. Furthermore, the cut surfaces of the rod ends were optically polished and then coated with a single-layered AR coat of $MgF_2$ whose center wavelength was 830 nm, thereby to obtain a laser medium. The thus obtained laser medium was attached to a holder which was 360° rotatable around, as the axis, the imaginary line connecting the centers of the end surfaces of the laser medium to each other. The laser medium so attached, together with excitation light sources and the like, form a solid state laser. FIG. 1 shows the construction of an experimental apparatus using the said solid state laser.

In FIG. 1, numerals 1 and 2 show a reflecting mirror and a reflection focussing mirror, respectively, while numerals 3 and 4 show excitation light sources, respectively. Numerals 5, 6 and 7 in the same figure, show a laser medium, a reflecting plane mirror and a path of the oscillated laser light, respectively.

The reflecting mirror 1 is one which has a 2000 mm radius of curvature and which reflects 100% of light having a wavelength in the range of 830 nm±50 nm. The reflection focussing mirror 2 is a double elliptic reflection focussing mirror which is plated with silver at the inside and which has a common-focus elliptic shape in cross section. The excitation light sources 3 and 4 are xenon flashlamps with a pulse time of $10^{-5}$ s (=10 $\mu$s). The laser medium 5 is a rod of chrysoberyl single crystal. The reflecting plane mirror 6 is one which reflects 95% of light having a wavelength in the range of 830 nm±50 nm.

FIG. 2 is a view showing the positional relationship between the excitation light source and the laser medium, viewed in the axial direction of these two components. The two excitation light sources (flashlamps) and the laser medium (chrysoberyl crystal rod) are located so that the central axes of said three components constitute a common plane and are parallel to each other. In FIG. 2 (a), the a-axis of chrysoberyl is included in the said common plane, while in FIG. (b), not the a-axis but the b-axis is included.

As shown in FIG. 1, the laser medium 5 is located so that the path 7 of light resonated in a light resonator composed of the reflecting mirror 1 and the reflecting plane mirror 6, and the longitudinal direction of the laser medium 5 approximately agree with each other, and is also located on the common focus of the reflection focussing mirror 2 as shown in FIG. 2. The excitation light sources 3 and 4 are located on the other two focuses. The reflecting mirror 1 and the reflecting plane mirror 6 are located on the light path 7 of the laser light emitted from the laser medium 5 as explained before.

Excitation lights emitted from the excitation light sources 3 and 4 are focussed on the laser medium 5 which is located at the common focus. The titanium ions in the laser medium 5 are then excited by the excitation lights to emit light. After this emitted light is resonated by oscillating between the reflecting mirror 1 and the reflecting plane mirror 6 (the path of resonated light being designated at numeral 7), the resonated light is outputted as oscillated laser light (wavelength 750-950 nm) from the light resonator.

With this experimental apparatus, the rod-shaped laser medium 5 was rotated around the longitudinal axis thereof thereby to arrange the b-axis direction of the chrysoberyl single crystal perpendicularly to the plane including the c-axis direction of said single crystal and the longitudinal direction of the excitation light-generating means (FIG. 2 (a)), thereby measuring the intensity (mJ) of oscillated laser light obtained. The results obtained are shown by open circles "○" in FIG. 3.

EXAMPLE 2

The procedure of Example 1 was followed except that the a-axis direction of the chrysoberyl single crystal was arranged perpendicularly to the plane including the longitudinal direction of the laser medium and that of the excitation light emission means (FIG. 2 (b)), thereby to measure the intensity of oscillated laser light 7 obtained. The results obtained are shown by closed circles "●" in FIG. 3.

These results of Examples 1 and 2 clearly show that using the laser of this invention, oscillated laser lights can be otained efficiently and, in addition, energy efficiency is further improved by arranging the b-axis direction of the chrysoberyl single crystal perpendicularly to the plane including the longitudinal direction of the laser medium and that of the excitation light emission means.

EXAMPLE 3 (Variation)

The reflection focussing mirror for excitation light has a co-focus elliptic shape in cross section and, however, the said mirror is not necessarily required to have such a shape in cross section and may have a single elliptic shape as shown in FIG. 4. In this case, energy efficiency can be further improved by arranging the b-axis direction of the chrysoberyl single crystal perpendicularly to the plane including the longitudinal direction of the laser medium and that of the excitation light emission means.

Further, the laser medium is rod-like in shape and, however, it may be slab-like (plate-like) in shape for use as desired.

EFFECT OF THE INVENTION

As mentioned above, chrysoberyl solid state lasers have been improved in energy efficiency by the present invention.

What is claimed is:

1. In a chrysoberyl solid state laser which comprises
    (a) a rod-like laser medium having one optical axis composed of a chrysoberyl single crystal containing trivalent titanium ions as luminescent ions, said crystal having an a-axis, b-axis and c-axis,
    (b) a means for generating excitation light for exciting said luminscent ions to emit light therefrom, said excitation light having an axis,
    (c) a means for focussing excitation light, generated by said means for generating excitation light, in said laser medium, and
    (d) a light resonator means for generating oscillated laser light by resonating the light emitted from said luminescent ions with said focused excitation light, the improvement wherein the direction of the c-axis of said crystal is made approximately the same as the longitudinal direction of the laser medium with respect to the optical axis of the laser medium and the laser medium is disposed so that the direction of the b-axis of said chrysoberyl crystal is approximately perpendicular to the plane including both the longitudinal direction of the laser medium and the axis of the excitation light.

2. The laser according to claim 3 wherein the a-axis, the b-axis and the c-axis are perpendicular to each other.

* * * * *

UNITED STATES PATENT AND TRADEMARK OFFICE
CERTIFICATE OF CORRECTION

PATENT NO. : 5,131,000

DATED : JULY 14,1992

INVENTOR(S) : Akiko Sugimoto, Yusaburo Segawa, Pil Hyon Kim and Susumu Nanba It is certified that error appears in the above-identified patent and that said Letters Patent is hereby corrected as shown below:

On the title page correct item

(30) To read; August 2,1989   Japan 1-199483

Signed and Sealed this

Twenty-fourth Day of August, 1993

Attest:

BRUCE LEHMAN

Attesting Officer    Commissioner of Patents and Trademarks